(12) United States Patent
Wood

(10) Patent No.: US 11,171,774 B2
(45) Date of Patent: Nov. 9, 2021

(54) SYSTEM FOR SYNCHRONIZING A CRYPTOGRAPHIC KEY STATE THROUGH A BLOCKCHAIN

(71) Applicant: Intel Corporation, Santa Clara, CA (US)

(72) Inventor: Matthew D. Wood, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 369 days.

(21) Appl. No.: 16/203,416

(22) Filed: Nov. 28, 2018

(65) Prior Publication Data
US 2020/0351074 A1 Nov. 5, 2020

(51) Int. Cl.
*H04L 9/06* (2006.01)
*H04L 9/08* (2006.01)
*H04L 9/32* (2006.01)
*H04L 29/06* (2006.01)

(52) U.S. Cl.
CPC ............ *H04L 9/0637* (2013.01); *H04L 9/088* (2013.01); *H04L 9/0861* (2013.01); *H04L 9/3247* (2013.01); *H04L 63/067* (2013.01); *H04L 2209/38* (2013.01)

(58) Field of Classification Search
CPC ..... H04L 9/0637; H04L 63/067; H04L 9/088; H04L 9/3247; H04L 9/0861; H04L 2209/38; H04L 9/3239
See application file for complete search history.

(56) References Cited

U.S. PATENT DOCUMENTS

| | | | | |
|---|---|---|---|---|
| 2018/0300693 A1* | 10/2018 | Gopinath | ............ | G06Q 20/4016 |
| 2020/0052886 A1* | 2/2020 | Buldas | .................. | H04L 9/0869 |
| 2020/0076619 A1* | 3/2020 | Irazabal | ................ | H04L 9/3239 |
| 2020/0211003 A1* | 7/2020 | Fletcher | ............. | G06Q 20/3829 |
| 2020/0374106 A1* | 11/2020 | Padmanabhan | ..... | H04L 63/0428 |
| 2020/0379856 A1* | 12/2020 | Jayachandran | ..... | G06F 11/3006 |

OTHER PUBLICATIONS

Huelsing, A., et al., "XMSS: eXtended Merkle Signature Scheme", Internet Research Task Force (IRTF) Request for Comments: 8391, May 2018, accessed at: https://tools.ietf.org/html/rfc8391, 74 pages.

* cited by examiner

*Primary Examiner* — Christopher A Revak
(74) *Attorney, Agent, or Firm* — Alliance IP, LLC

(57) ABSTRACT

In one embodiment, an apparatus comprising a memory to store a first value of a cryptographic key state; and a processor to generate a request to commit the first value of the cryptographic key state into a block of a blockchain, the blockchain to synchronize the cryptographic key state for a plurality of security modules; and generate a one-time cryptographic key based on the first value of the cryptographic key state responsive to a determination that the first value of the cryptographic key state has been committed to the blockchain.

20 Claims, 6 Drawing Sheets

SYSTEM FOR SYNCHRONIZING A CRYPTOGRAPHIC KEY STATE THROUGH A BLOCKCHAIN

BACKGROUND

Cryptography may involve generating codes that allow information to be kept secret. Cryptography may convert data into a format that is unreadable absent authorization. Encrypting of data may allow transmission of the data without compromising the data.

BRIEF DESCRIPTION OF THE DRAWINGS

Like reference numbers and designations in the various drawings indicate like elements.

DETAILED DESCRIPTION

Figure 1:
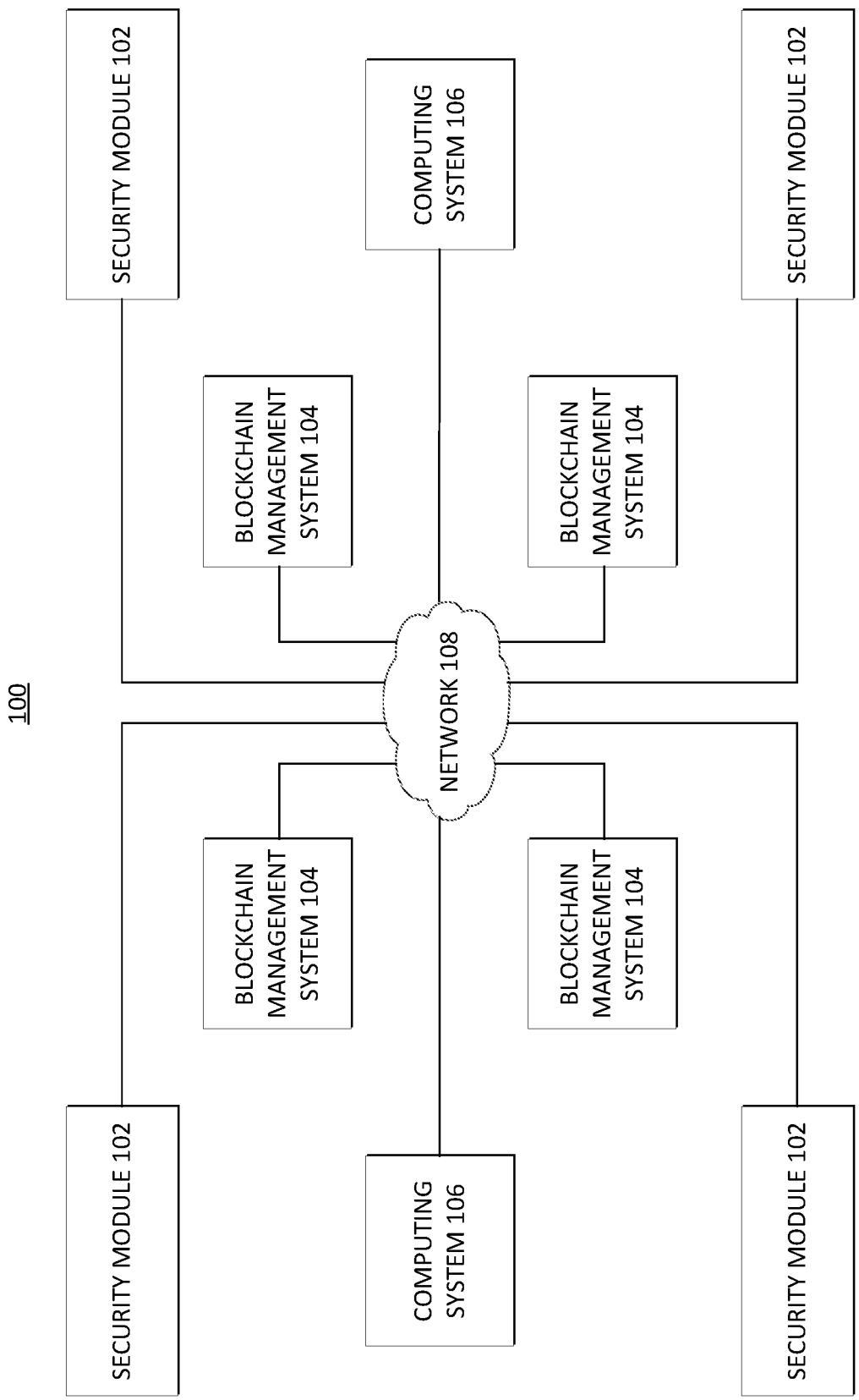
FIG. 1 illustrates a system for synchronizing a cryptographic key state through a blockchain in accordance with certain embodiments.

FIG. 1 illustrates a system 100 for synchronizing a cryptographic key state through a blockchain in accordance with certain embodiments. System 100 comprises a plurality of security modules 102, blockchain management systems 104, and computing systems 106 coupled together through a network 108. Security modules 102 may receive requests from one or more computing systems 106 and may securely sign data on behalf of the computing systems 106.

High security implementations for various signature methods may utilize a set of distributed security modules 102 to protect keys and provide redundancy and throughput. In general, a cryptographic key is a string of bits that is used by a cryptographic algorithm to encrypt or decrypt data (e.g., transform clear text into cipher text or vice versa), such as would be used, e.g., in performing digital signatures. In various embodiments, a state of a cryptographic key (and/or other data) may be synchronized among the various security modules 102 to facilitate a signing scheme. As one example, security modules 102 may implement a hash-based signature scheme for code signing, such as an eXtended Merkle Signature Scheme (XMSS) or Multi Tree XMSS (XMSSMT) that maintains a state in the form of a monotonic counter to ensure that no two signatures re-use a key based on the same counter value, as reuse of a counter value may completely compromise a signing key that is shared among the security modules 102. In such a scheme, the counter may be used to derive a series of one-time signature keys from a common secret signing key.

Hash-based signature schemes (e.g., XMSS, $XMSS^{MT}$) may use cryptographic algorithms that aren't readily susceptible to hacking by quantum computers (unlike some other signature schemes such as RSA and Elliptic Curve Digital Signature Algorithm (ECDSA)) but may incur overhead associated with state synchronization among the signing entities (e.g., security modules). Implementing state synchronization across security modules is a difficult problem to do efficiently and securely, due to network failures and delays. For example, all security modules must either agree on every increment of the counter or the counter range must be divided between security modules such that they each have their own unique counter range (e.g., a central broker may distribute the ranges). The former scenario may be inefficient and may encounter difficulty keeping up with signature demand. For example, this scenario may utilize a distributed database with hierarchical authority nodes to address contentions on a counter value. Distributed databases incur a transaction processing time dependent on the form and number of nodes and depth of the hierarchy authority. Commitment of values across the network for resiliency may be high, especially if the system is geographically distributed across the globe. Loss of network connection may result in a complete halt of the system. The later scenario (in which ranges of counters are apportioned) may require each security module to manage its own secure counter. This scenario also risks that a significant portion of valid counter values must be abandoned due to a failure of a security module. Additionally, the later scenario introduces difficulty in extending capacity through adding security modules since the counter ranges must be securely reallocated.

Various embodiments of the present disclosure utilize a blockchain to ensure synchronized use of hash-based signatures among cooperating security modules 102. In particular embodiments, a blockchain includes a smart contract that is executed by the blockchain management systems 104 to ensure that the security modules 102 utilizing a common hash-based private key do not re-use a state value (e.g., by guaranteeing that the state is correct across all collaborating security modules 102 and protecting against race conditions), that failure of a security module 102 does not cause significant loss of signature space (e.g., the state is defended against an accidental or deliberate rollback event by virtue of blockchain properties related to ledger consensus), that adding additional security modules 102 to the system to recover from device failure or to add capacity occurs seamlessly (e.g., by adding an identifier of a new security module 102 into a permissioned set of the blockchain), and/or providing additional signature audit capabilities (e.g., by recording additional information associated with each state in the blockchain). The security modules 102 may act as transaction creators and consumers of the blockchain. The blockchain management systems 104 may operate a blockchain consensus algorithm that ensures proper smart contract execution and key integrity.

Although various embodiments described herein focus on synchronizing a state in the form of a counter for one-time key generation, other embodiments may include synchronizing any suitable state using a blockchain. For example, in some embodiments, a cryptographic key may have a useful life after which the key should be retired (e.g., a cryptographic key may be used only a certain number of times). In such an embodiment, the state tracked by the blockchain may indicate the number of times the cryptographic key has been used and the smart contract may specify the maximum number of times the cryptographic key may be used. Other embodiments contemplate tracking any other state associated with a cryptographic key.

A security module 102 may comprise a computing system operable to perform cryptographic operations based on a key. For example, security module 102 may digitally sign data and/or encrypt data based on one or more keys. A digital signature may prove the authenticity of the signed data. Digitally signing data may involve generation of a signature comprising a cryptographic value based on the data and a private key and provision of a corresponding public key that may be used to verify the authenticity of the digital signature. In one example, the data to be signed may be hashed, and a signature algorithm may receive the hash and the private key as inputs and provide the signature as the output. In some embodiments, security module 102 may implement a signing scheme in which a one-time key based on a secret signing key and a state value is used as the private key to generate a digital signature. A subsequent digital signature may utilize a private key that is based on the secret key and a different state value. Such one-time key schemes may be more resilient to quantum computing based attacks than other signing algorithms, such as RSA or ECDSA, but when multiple security modules 102 share the same secret signing key (e.g., when multiple security modules 102 load balance signing duties), the security modules 102 must ensure that the same state is not used twice during signature generation.

Security module 102 may comprise a computing system that protects one or more digital keys and provides cryptographic processing based on such keys. Security module 102 may comprise any suitable form factor. For example, security module 102 may comprise a plug-in card or device that couples to another computing device. Security module 102 may include features that protect against tampering and/or provide evidence when tampering has occurred. For example, when a security module 102 is tampered with, the security module 102 may delete the keys or otherwise make the keys inaccessible (e.g., by melting or incinerating (e.g., via thermite) a component which stores a key or by encasing the component in epoxy). A security module 102 will be described in more detail in connection with FIG. 4.

A blockchain management system 104 may comprise one or more computing systems to manage a blockchain that synchronize state for the security modules 102. The blockchain management systems 104 may cooperate to build the blockchain by receiving requests for state value usage from the security modules, determining whether the requests are valid, and committing the requests to the blockchain. A blockchain management system 104 will be described in more detail in connection with FIG. 5.

Computing systems 106 may comprise any suitable computing devices to send requests for cryptographic operations (e.g., signing of data) to one or more security modules 102. The requested cryptographic data may be returned to the requesting computing system 106 or to a different computing system 106 (e.g., as specified in the request).

In various embodiments, a security module 102 and a blockchain management system 104 may be collocated and/or share common hardware (e.g., one or more processors or memory) to perform their respective functions. As mining functions (where mining may encompass the process of adding transactions to a distributed ledger of existing transactions) generally require advanced computation capabilities, in various embodiments, blockchain management system 104 may be discrete from security module 102 (e.g., when security module 102 does not include advanced blockchain processing capabilities). Similarly, a blockchain management system 104 and a computing system 106 may be collocated and/or share common hardware to perform their respective functions. For example, in an enterprise or other organizational environment a computing system comprising one or more computing devices may both send requests to security module 102 (or perform other related data processing tasks) and manage the blockchain.

Any of the modules and systems of system 100 may communicate via one or more networks 108. A network 108 may be any suitable network or combination of one or more networks operating using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices. A network offers communicative interfaces between sources and/or hosts and may comprise any local area network (LAN), wireless local area network (WLAN), metropolitan area network (MAN), Intranet, Extranet, Internet, wide area network (WAN), virtual private network (VPN), cellular network, or any other appropriate architecture or system that facilitates communications in a network environment. A network can comprise any number of hardware or software elements coupled to (and in communication with) each other through a communications medium.

Figure 2:
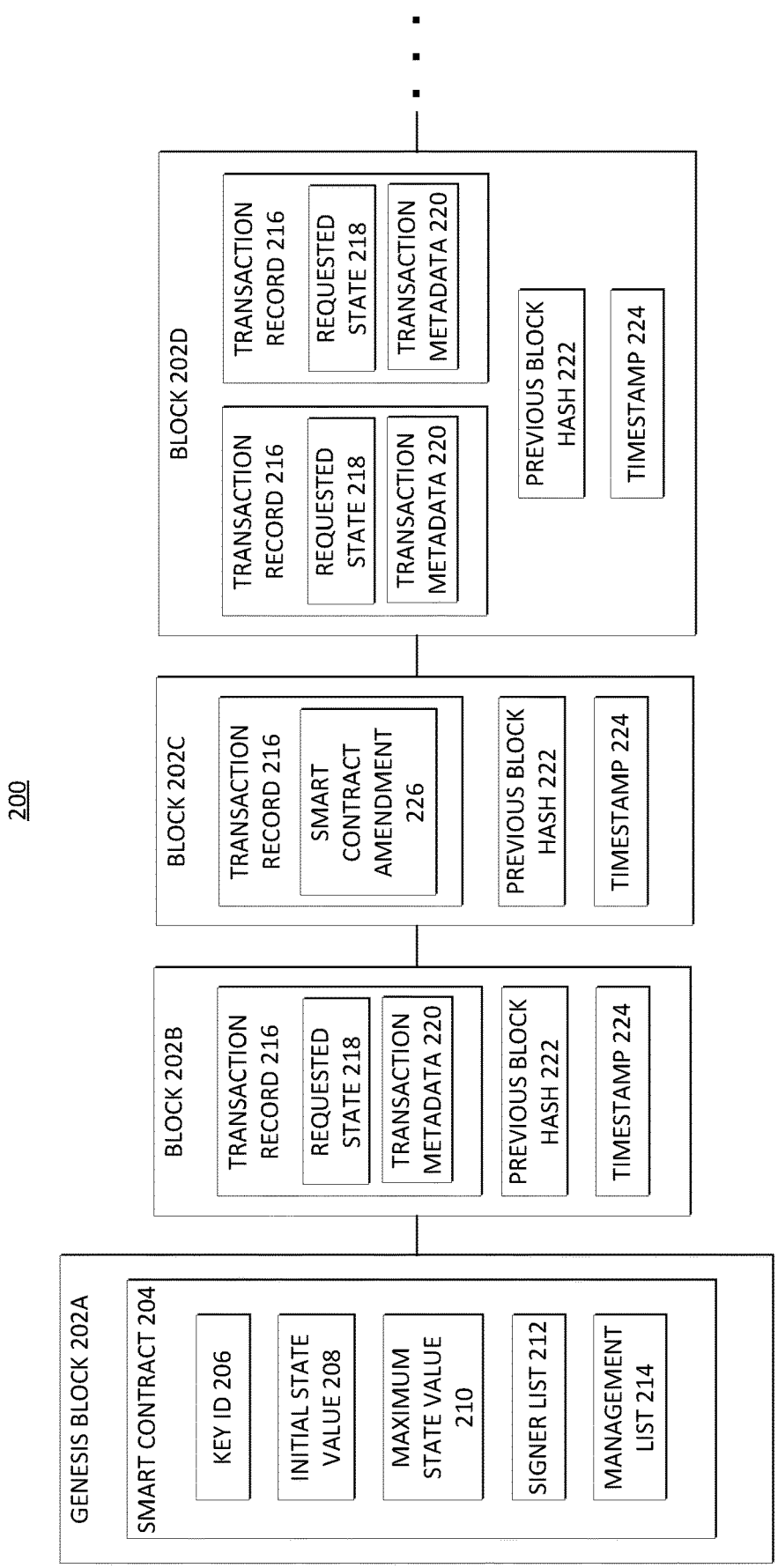
FIG. 2 illustrates a portion of a blockchain in accordance with certain embodiments.

FIG. 2 illustrates a portion of a blockchain 200 in accordance with certain embodiments. Blockchain 200 is a distributed ledger where each unit of data is a "block" of one or more records that are chained together via cryptographic hashes. New blocks are created and added to the chain when participants in the distributed ledger (e.g., blockchain management systems 104) form a consensus that all records in the block meet the requirements of one or more smart contracts specified by the blockchain. In various embodiments, any suitable consensus method may be used by the blockchain management systems 104, such as proof-of-work or proof-of-elapsed-time (e.g., POET or Hyperledger Sawtooth).

The blockchain includes a genesis block 202A (i.e., a first block of the blockchain). In the embodiment depicted, the genesis block 202A includes a smart contract 204. In other embodiments, the smart contract 204 may be stored in any other block or combinations of blocks of the blockchain 200. Smart contract 204 may include executable logic (e.g., one or more scripts) for determining whether a proposed transaction may be committed to the block. For example, smart contract 204 may govern how related transactions are processed to form a valid consensus among multiple blockchain management systems 104 (a smart contract may be executed by each of the blockchain management systems 104). The smart contract 204 ensures that no two security modules 102 may claim the same state. When a state is requested by a security module 102, the blockchain management systems 104 may each examine the records of the blockchain 200 to determine whether the state has already been used and is otherwise in compliance with constraints specified by the smart contract 204 (e.g., if it is greater than the initial state value 208 and/or less than the maximum state value 210). In some embodiments, the smart contract 204 may also specify the order in which the state may change. For example, the smart contract 204 may specify that the state must increment in order by one. In another example, the smart contract 204 may allow any unused state to be reserved. In yet other examples, the smart contract 204 may specify any suitable constraints on state reservations. If the blockchain management systems 104 agree that the request is valid (e.g., as specified by the smart contract), they can agree to commit the requested state into the blockchain 200.

When a new common secret signing key (to be shared among security modules 102 to generate one-time keys) is generated by one of the security modules 102, a new smart contract 204 specific to the signing key may be committed to the blockchain. Smart contract 204 may specify one or more of a key identifier 206, initial state value 208, a maximum state value 210, a signer list 212, a management list 214, and/or other suitable information. Key identifier 206 may comprise any suitable identifier that uniquely identifies a common secret signing key. The key identifier 206 may be compared to a key identifier included in a request received from a security module 102 to identify the proper smart contract to be applied to the request. In a particular embodiment, the initial state value 208 is 0, though in other embodiments, the initial state value may be any suitable counter value. The initial state value and the maximum state value may be based on the number of available one-time keys that may be generated by the security modules 102 based on the common secret signing key.

The signer list 212 may comprise a list of identifiers of entities (e.g., security modules 102) allowed to request a change to the state value. Clients of the blockchain 100 (e.g., security modules 102) may each have an identifying address, which in some embodiments is a public verification key (of a key pair), a portion thereof, or a value derived therefrom (e.g., a SHA-256 digest) used in conjunction with transaction records digitally signed by the client when a request for a state is submitted, wherein the signed transactions records are to be added to the ledger (when they meet the requirements specified by the smart contract). A security module 102 may generate an identifying address for itself, e.g., as part of an initialization process. A trusted node (e.g., blockchain management system 104) may add the identifying address to a list of clients which is included as signer list 212 within the smart contract 204.

Smart contract 204 may also specify a management list 214. The management list 214 comprises a set of identifiers (e.g., addresses) of entities (e.g., blockchain management systems 104) that are allowed to change the signer list 212 (e.g., by adding a record indicating an addition to or deletion from the initial signer list 212 to the blockchain) or other parameters of the smart contract.

When a security module 102 is going to generate a one-time key (e.g., in conjunction with generation of a digital signature), it generates a request to commit a state into the blockchain 200 to reserve the next valid counter value. The security module 102 waits until it receives a notification that the request has been committed into the blockchain 200 by consensus and then may generate the digital signature using the one-time key generated based on the committed state and the signing key.

Block 202B includes a transaction record 216. The transaction record 216 includes a requested state 218 (e.g., a counter value) and transaction metadata 220. The state 218 has been committed to the blockchain and thus may be used by the requesting security module 102 to generate a one-time key. Transaction metadata 220 may include any suitable information associated with the requested state 218. For example, transaction metadata 220 may include an identifier (e.g., address, public key, etc.) of the requesting entity (e.g., security module 102). As another example, transaction metadata 220 may include an identification of the data to be signed using the one-time key that is to be generated based on the requested state 218. Transaction metadata 220 may provide auditing abilities associated with the signing requests.

The block 202B may be linked to the genesis block 202A via previous block hash 222. Previous block hash may comprise a hash of the data of the previous block (i.e., the genesis block 202A). After the genesis block 202A, each subsequent block includes the hash of the block previous to that block. In this manner, each block inherits from the previous block because the previous block's hash will be used as part of the input to create the hash that will be stored in the next block. Block 202B may also comprise a timestamp 224 indicating the time at which the block 202B was committed to the blockchain. In various embodiments, blocks 202 may include any other suitable information, such as nonces (e.g., a value that a miner solves prior to committing the block to the blockchain), Merkle trees (a tree describing data within the block), or other suitable information to facilitate building and verification of the blockchain. In various embodiments, a committed block (e.g., 202B) may include some proof of validity, such as a proof-of-work value (e.g., as used or similar to that used, e.g., in Bitcoin or Etherium), a proof-of-stake value, a proof-of-elapsed time value (e.g., as used or similar to that used in POET), or other suitable value evidencing the validity of the block.

Block 202B includes a single transaction record 216A with a single requested state 218. In various embodiments, a block may include any suitable number of transaction records specifying any number of requested states. For example, block 202D includes multiple transaction records 216 (though each of these records would specify a different state). In some examples, a transaction record 216 may include a range of requested states (e.g., a plurality of states may be allocated to a particular security module 102 in response to a request from the security module 102).

A block of the blockchain may also include one or more amendments to the smart contract 204. For example, a transaction record of block 216 includes a smart contract amendment 226, which may be, e.g., an amendment to the signer list 212, management list 214, and/or other portion of the smart contract 204. Thus, when amendments are present, the smart contract 204 may span across multiple blocks. An authorized signer amendment may add a signer (e.g., security module 102) to the signer list 212 (e.g., the signer list 212 may include a set of addresses of entities allowed to request a change to the state value) or remove a signer from the signer list while an authorized manager amendment may add a contract manager to the management list 214 or remove a manager from the management list (e.g., the management list may include a set of addresses of entities allowed to change the signer list).

Before the smart contract amendment 226 is committed to the blockchain 200, the blockchain management systems 104 may execute the smart contract 204 to determine whether the entity requesting the amendment is authorized to make the amendment. For example, the blockchain management systems 104 may check the management list 214 to determine whether an identifier included therein matches an identifier of the entity submitting the request for the smart contract amendment 226. Any suitable entity may be identified within the management list 214, such as blockchain management systems 104 or other trusted computing systems.

Similar to block 202B, blocks 202C and 202D also are linked to the respective previous block via respective previous block hashes 206. Each of these blocks also includes a timestamp 224. In this manner, the blockchain may be built using blocks that each include one or more transaction records.

In one embodiment, a request to freeze the key identified by the key ID 206 may be submitted by a member of the management list 214 and a transaction record indicating such may be committed to the blockchain, such that any further requests for states for the particular signing key will be rejected, effectively discontinuing use of that key.

The blockchain 200 may include any other types of transaction records that may be recorded in the same block as a transaction record with a requested state or in a block in between blocks committing requested states. For example, the transaction records may be used for general asset tracking or other suitable purposes.

As the blockchain 200 may be distributed (e.g., stored in whole or in part by each of the blockchain management systems 104), when a system 104 is offline for a period of time, the system 104 may contact one or more other systems 104 in order to reconstruct its copy of the blockchain upon recovery (similarly a new blockchain management system 104 may construct its copy of the blockchain based on information received from one or more other systems 104).

Figure 3:
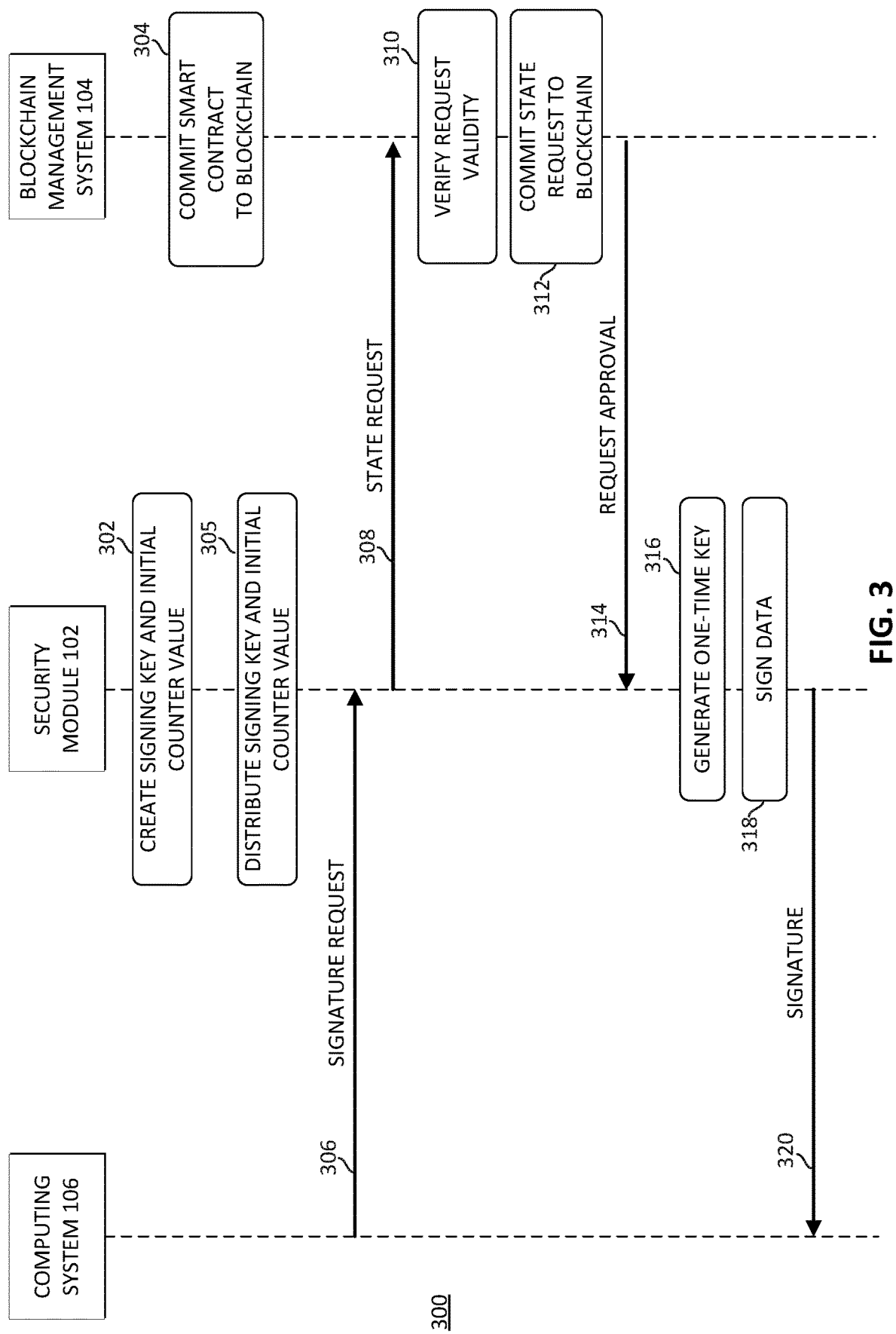
FIG. 3 illustrates a flow for signing data via a system for synchronizing a cryptographic key state through a blockchain in accordance with certain embodiments.

FIG. 3 illustrates a flow 300 for signing data via a system for synchronizing cryptographic key state through a blockchain in accordance with certain embodiments. At 302, a signing key and an initial counter value is created by a security module 102. In various embodiments, the signing key may be created by generating a random number. The security module 102 may also share information about the creation of the signing key (e.g., key ID 206, initial state value 208, maximum state value 210, and/or other information) with a blockchain management system 104 so that the blockchain management systems 104 may generate and/or commit a smart contract (e.g., 204) with information about the signing key to a blockchain (e.g., 200) at 304. As an alternative, the security module 102 itself may generate the smart contract for the signing key and then submit the signing key and the smart contract to blockchain management system 104 and wait for them to be committed to the blockchain. Upon committal, the security module 102 may distribute the signing key to the other security modules 102 at 305. In an alternative embodiment, the signing key may be distributed to the other security modules prior to being committed to the blockchain.

After the smart contract has been committed to the blockchain and the signing key is provided to the security modules 102, the security modules 102 may begin generation of one-time keys based on the signing key. At 306, a signature request is sent from a computing system 106 to a security module 102. In various embodiments, prior to providing a signature in response to the request, the computing system 106 is authorized by the security module 102 (e.g., according to the signer list 212). The signature request may include a request to sign and/or encrypt data on behalf of the computing system 106.

At 308, a state request is sent from the security module 102 to the blockchain management system 104. In an embodiment, the state request includes an identifier of the signing key and a requested state (or multiple requested states). In various embodiments, a security module 102 may track the state value (or values) that was most recently committed (or additional used state value) to the blockchain and may request the next state value (or range of values) in state request 308. In order to do this, the security module 102 may access the blockchain directly or may communicate with an entity that accesses the blockchain on the security module's behalf and extracts relevant information about the used state values.

At 310, the blockchain management system 104 verifies the validity of the request 308 according to smart contract 204. In a particular embodiment, various blockchain management systems 104 may execute the smart contract committed to the blockchain for the signing key to determine whether the requested state may be allocated to the requesting security module 102. For example, the blockchain management systems 104 may examine the states committed to the blockchain and constraining parameters specified in the smart contract (e.g., initial counter value, maximum counter value, or other constraints) to determine whether the request is valid. In response to a determination that the request is valid, the state request is committed to the blockchain at 312 (e.g., a transaction record with information from the state request is included in a block added to the blockchain).

At 314, an approval of the request is sent from blockchain management system 104 (or other entity that monitors the blockchain). The approval may indicate that the requested state has been allocated to the security module 102. In some embodiments, rather than the blockchain management system 104 sending an affirmative request approval 314 to the security module, the security module may monitor the blockchain and detect that the requested state has been committed and assigned to the security module.

At 316, the security module 102 generates a one-time key based on the allocated state (or a state value from an allocated range of states) and then signs the data at 318 using the one-time key. At 320, the security module 102 returns the requested signature. The security module 102 may also provide a public key corresponding to the one-time key that may be used to decipher the signature.

Some of the operations illustrated in FIG. 3 may be repeated, combined, modified or deleted where appropriate, and additional steps may also be added to the flow in various embodiments. Additionally, steps may be performed in any suitable order without departing from the scope of particular embodiments. As one example, a security module 102 may send a request for a state prior to receiving a request for a signature, so as to reduce the latency between a signature request and a signature generation.

In various embodiments, the signature scheme used to generate the signatures for computing systems 106 is a one-time signature scheme, such as XMSS or $XMSS^{MT}$. In XMSS, a Merkle tree may be formed, where each leaf in the tree represents a one-time key (e.g., a Winternitz One-Time Signature Plus (WOTS+) key). In $XMSS^{MT}$, a series of Merkle trees are formed, with each Merkle tree having leaves that each represent one-time keys. In an embodiment in which XMSS is employed, the state values tracked in the blockchain may each represent a distinct position of a leaf node of the Merkle tree. In an embodiment in which $XMSS^{MT}$ is employed, the state values tracked in the blockchain may each represent a distinct tree and a distinct position of a leaf node of the tree. In a particular embodiment, a request sent from a security module 102 may include a request for a plurality of counters corresponding to leaves of an entire tree in an $XMSS^{MT}$ scheme, such that a range of states may be allocated for a single request and the number of records that need to be committed to the blockchain may be reduced.

To determine a one-time signature, a security module 102 may utilize the secret signing key (as a root value), various generator parameters, and a state value. In a particular embodiment, one or more of these values may be committed into the blockchain and the other security modules 102 may clone these values from the blockchain (or these values may be securely distributed to the other security modules 102 in other suitable manners).

Figure 4:
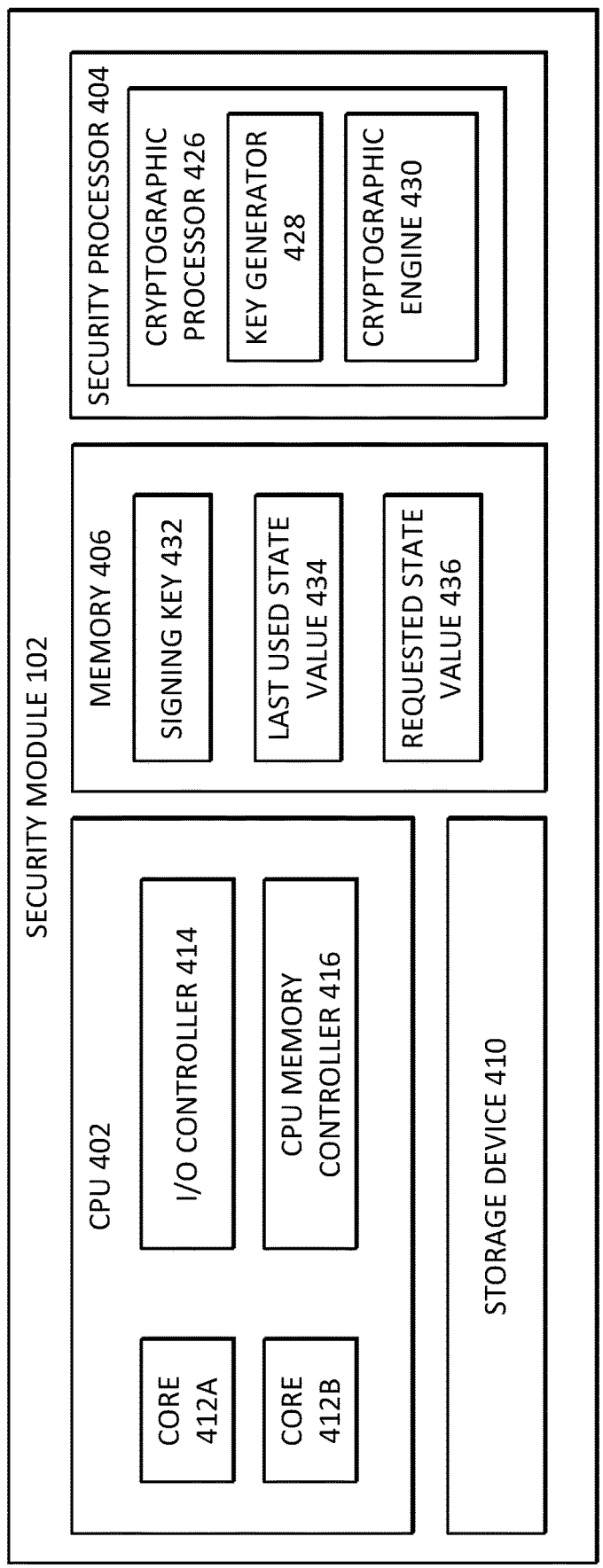
FIG. 4 illustrates a security module in accordance with certain embodiments.

FIG. 4 illustrates a security module 102 in accordance with certain embodiments. In the embodiment depicted, security module 102 comprises CPU 402, security processor 404, memory 406, and storage device 410. Although CPU 402 and security processor 404 are shown as discrete components, in a general sense they may be considered as being part of the same processor of security module 102. In some embodiments, CPU 402 and security processor 404 may even be integrated on the same semiconductor chip.

CPU 402 and/or security processor 404 may comprise a processor, such as a microprocessor, an embedded processor, a digital signal processor (DSP), a network processor, a handheld processor, an application processor, a co-processor, a system on a chip (SOC), or other device to execute code (i.e., software instructions). CPU 402, in the depicted embodiment, includes two processing elements (cores 412A and 412B in the depicted embodiment), which may include asymmetric processing elements or symmetric processing elements. However, a processor may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core 412 may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

In various embodiments, the processing elements may also include one or more arithmetic logic units (ALUs), floating point units (FPUs), caches, instruction pipelines, interrupt handling hardware, registers, or other hardware to facilitate the operations of the processing elements.

I/O controller 414 may include logic for communicating data between CPU 402 and I/O devices, which may refer to any suitable devices capable of transferring data to and/or receiving data from an electronic system, such as CPU 402. For example, an I/O device may comprise an audio/video (A/V) device controller such as a graphics accelerator or audio controller; a data storage device controller, such as a flash memory device, magnetic storage disk, or optical storage disk controller; a wireless transceiver; a network processor; a network interface controller; or a controller for another input devices such as a monitor, printer, mouse, keyboard, or scanner; or other suitable device. In a particular embodiment, an I/O device may comprise a storage device 410 that may be coupled to the CPU 402 through I/O controller 414.

An I/O device may communicate with the I/O controller 414 of the CPU 402 using any suitable signaling protocol, such as peripheral component interconnect (PCI), PCI Express (PCIe), Universal Serial Bus (USB), Serial Attached SCSI (SAS), Serial ATA (SATA), Fibre Channel (FC), IEEE 802.3, IEEE 802.11, or other current or future signaling protocol. In particular embodiments, I/O controller 414 and the underlying I/O device may communicate data and commands in accordance with a logical device interface specification such as Non-Volatile Memory Express (NVMe) (e.g., as described by one or more of the specifications available at www.nvmexpress.org/specifications/) or Advanced Host Controller Interface (AHCI) (e.g., as described by one or more AHCI specifications such as Serial ATA AHCI: Specification, Rev. 1.3.1 available at http://www.intel.com/content/www/us/en/io/serial-ata/serial-ata-ahci-spec-rev1-3-1.html). In various embodiments, I/O devices coupled to the I/O controller may be located off-chip (i.e., not on the same chip as CPU 402) or may be integrated on the same chip as the CPU 402.

In various embodiments, CPU memory controller 416 may include logic to control the flow of data going to and from one or more memories 406. CPU memory controller 416 may include logic operable to read from a memory 406, write to a memory 406, or to request other operations from a memory 406. In various embodiments, CPU memory controller 416 may receive write requests from cores 414 and/or I/O controller 414 and may provide data specified in these requests to a memory 406 for storage therein. CPU memory controller 416 may also read data from a memory 406 and provide the read data to I/O controller 414 or a core 412. During operation, CPU memory controller 416 may issue commands including one or more addresses of the memory 406 in order to read data from or write data to memory (or to perform other operations). In some embodiments, CPU memory controller 416 may be implemented on the same chip as CPU 402, whereas in other embodiments, CPU memory controller 416 may be implemented on a different chip than that of CPU 402. I/O controller 414 may perform similar operations with respect to one or more storage devices 406.

A memory 406 may store any suitable data, such as data used by CPU 402 or security processor 404 to provide the functionality of security module 102. For example, data associated with programs that are executed or files accessed by cores 412 may be stored in memory 406. Thus, a memory 406 may include a system memory that stores data and/or sequences of instructions that are executed or otherwise used by the cores 412. In various embodiments, a memory 406 may store persistent data (e.g., a user's files or instruction sequences) that remains stored even after power to the memory 406 is removed. A memory 406 may be dedicated to a particular CPU 402 or shared with other devices (e.g., one or more other processors or other devices) of security module 102.

Memory 406 may also store any suitable data used by security processor 404. For example, in the embodiment depicted, memory 406 stores a signing key 432, a last used state value 434, and a requested state value 436. The signing key 432 may be used in conjunction with a state value to generate a one-time key. Last used state value 434 may be extracted from the blockchain and stored by security module 102 to allow the security module to determine a state value 346 to request. As a consumer of the blockchain, security modules 102 may be capable of interpreting blocks and extracting relevant records for keys they manage. Knowing the latest committed state gives a security module 102 the ability to request the correct next counter value. If a security module 102 falls behind on processing records, it may request a counter value that has already been claimed by another participant. While this doesn't impact security, it negatively affects efficiency since it will need to attempt another reservation. For efficiency, each security module 102 may choose to track the last known good block to support faster synchronization in recovery scenarios, including intermittent disconnection from the blockchain.

In various embodiments, a memory 406 may include a memory comprising any number of memory arrays, a memory device controller, and other supporting logic (not shown). A memory array may include non-volatile memory and/or volatile memory. Non-volatile memory is a storage medium that does not require power to maintain the state of data stored by the medium. Nonlimiting examples of non-volatile memory may include any or a combination of: solid state memory (such as planar or 3D NAND flash memory or NOR flash memory), 3D crosspoint memory, memory devices that use chalcogenide phase change material (e.g., chalcogenide glass), byte addressable nonvolatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), other various types of non-volatile random access memories (RAMs), and magnetic storage memory. In some embodiments, 3D crosspoint memory may comprise a transistor-less stackable cross point architecture in which memory cells sit at the intersection of words lines and bit lines and are individually addressable and in which bit storage is based on a change in bulk resistance. Volatile memory is a storage medium that requires power to maintain the state of data stored by the medium. Examples of volatile memory may include various types of random access memory (RAM), such as dynamic random-access memory (DRAM) or static random-access memory (SRAM). One particular type of DRAM that may be used in a memory array is synchronous dynamic random-access memory (SDRAM). In some embodiments, any portion of memory 406 that is volatile memory can comply with JEDEC standards including but not limited to Double Data Rate (DDR) standards, e.g., DDR3, 4, and 5, or Low Power DDR4 (LPDDR4) as well as emerging standards.

A storage device 410 may store any suitable data, such as data used by CPU 402 or security processor 404 to provide functionality of security module 102. For example, data associated with programs that are executed or files accessed by cores 412A and 412B may be stored in storage device 410. Thus, in some embodiments, a storage device 410 may store data and/or sequences of instructions that are executed or otherwise used by the cores 412A and 412B. In various embodiments, a storage device 410 may store persistent data (e.g., a user's files or software application code) that remains stored even after power to the storage device 410 is removed. A storage device 410 may be dedicated to CPU 402 or shared with other devices (e.g., security processor 404) of security module 102.

In various embodiments, storage device 410 includes a storage device controller and one or more memory modules. In various embodiments, a memory module of storage device 410 comprises one or more NAND flash memory arrays, one or more hard disk drives, or other suitable memory storage devices. Storage device 410 may comprise any suitable type of memory and is not limited to a particular speed, technology, or form factor of memory in various embodiments. For example, a storage device 410 may be a disk drive (such as a solid-state drive), a flash drive, memory integrated with a computing device (e.g., memory integrated on a circuit board of the computing device), a memory module (e.g., a dual in-line memory module) that may be inserted in a memory socket, or other type of storage device. Moreover, security module 102 may include multiple different types of storage devices. Storage device 410 may include any suitable interface to communicate with CPU memory controller 416 or I/O controller 414 using any suitable communication protocol such as a DDR-based protocol, PCI, PCIe, USB, SAS, SATA, FC, System Management Bus (SMBus), or other suitable protocol. A storage device 410 may also include a communication interface to communicate with CPU memory controller 416 or I/O controller 414 in accordance with any suitable logical device interface specification such as NVMe, AHCI, or other suitable specification. In particular embodiments, storage device 410 may comprise multiple communication interfaces that each communicate using a separate protocol with CPU memory controller 416 and/or I/O controller 414.

In some embodiments, all, or some of the elements of security module 102 are resident on (or coupled to) the same circuit board (e.g., a motherboard). In various embodiments, any suitable partitioning between the elements may exist. For example, the elements depicted in CPU 402 may be located on a single die (i.e., on-chip) or package or any of the elements of CPU 402 may be located off-chip or off-package. Similarly, the elements depicted in storage device 410 may be located on a single chip or on multiple chips. In various embodiments, a storage device 410 and a host computing device (e.g., CPU 402) may be located on the same circuit board or on the same device and in other embodiments the storage device 410 and the host computing device may be located on different circuit boards or devices.

Security processor 404 may be any suitable processor capable of generating cryptographic keys, securely storing one or more keys, and/or performing one or more encryption algorithms. Key generator 428 may include a random number generator that produces random numbers and logic that uses the random numbers to construct keys for cryptographic functions (in various embodiments the random numbers themselves may be used as keys or may be processed to generate keys). The random numbers and/or keys generated by key generator 428 may be any suitable length. In a particular embodiment, key generator 428 may generate a secret signing key utilized by a plurality of security modules 102 (e.g., via their respective key generators 428) to generate one-time keys. Key generator 428 may also generate one-time keys based on the secret signing key.

Cryptographic engine 430 may receive data and a cryptographic key (e.g., a one-time key) as input and generate encrypted data and/or a digital signature as output. In various embodiments, key generator 428 and/or cryptographic engine 430 may be standalone logic or may be integrated with one or more other components of CPU 402 (e.g., core 412A).

The components of security module 102 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, and a Gunning transceiver logic (GTL) bus. In various embodiments, an integrated I/O subsystem includes point-to-point multiplexing logic between various components of security module 102, such as cores 412, one or more CPU memory controllers 416, I/O controller 414, integrated I/O devices, direct memory access (DMA) logic (not shown), etc. In various embodiments, components of security module 102 may be coupled together through one or more networks comprising any number of intervening network nodes, such as routers, switches, or other computing devices. For example, a host computing device (e.g., CPU 402) and the storage device 410 may be communicably coupled through a network.

Although not depicted, security module 102 may use a battery and/or power supply outlet connector and associated system to receive power, a display to output data provided by CPU 402, or a network interface allowing the CPU 402 to communicate over a network. In various embodiments, the battery, power supply outlet connector, display, and/or network interface may be communicatively coupled to CPU 402. Other sources of power can be used such as renewable energy (e.g., solar power or motion based power).

In some embodiments, all or some of the elements of security module 102 are resident on (or coupled to) the same circuit board (e.g., a motherboard). In various embodiments, any suitable partitioning between the elements may exist. For example, the elements depicted in CPU 402 may be located on a single die (i.e., on-chip) or package or any of the elements of CPU 402 may be located off-chip or off-package. Similarly, the elements depicted in security processor 404 may be located on a single chip or on multiple chips. In a particular embodiment, CPU 402 is located on a first semiconductor package coupled to a circuit board and security processor 404 is located on a second semiconductor package coupled to the circuit board.

Figure 5:
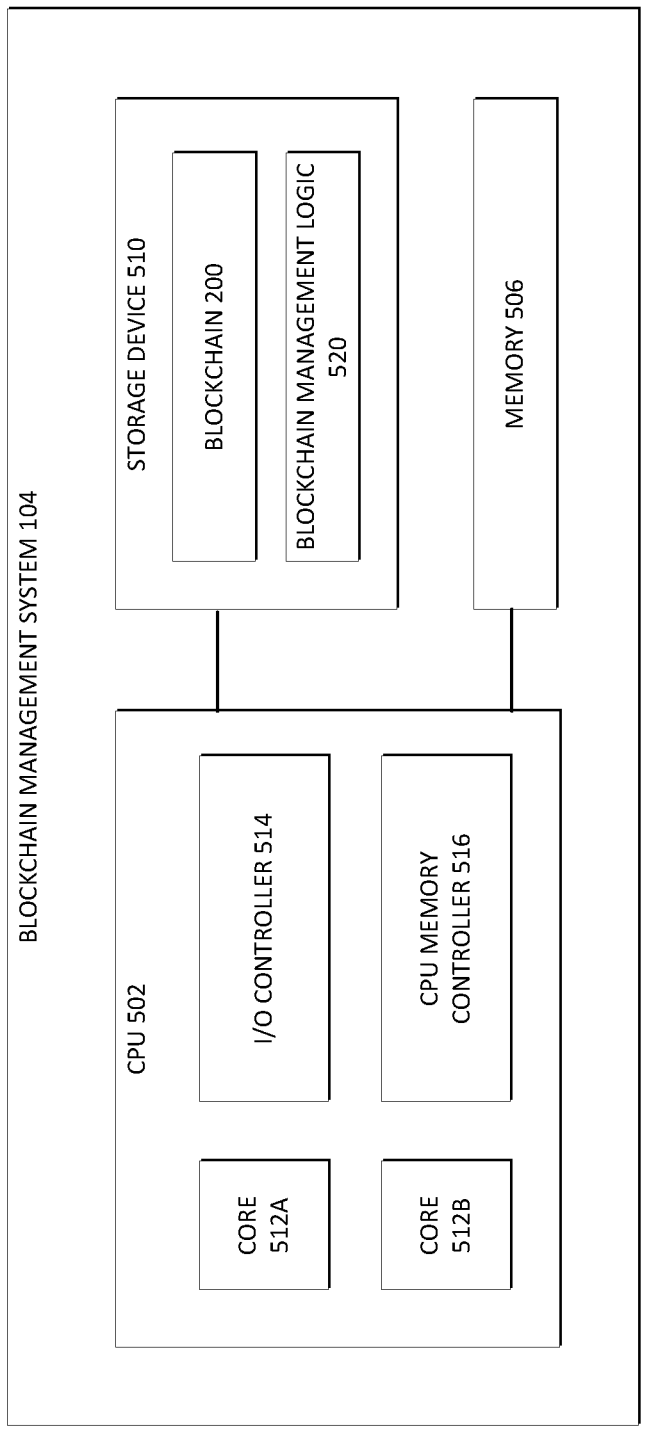
FIG. 5 illustrates a blockchain management system in accordance with certain embodiments.

FIG. 5 illustrates a blockchain management system 104 in accordance with certain embodiments. Blockchain management system 104 depicts a computing system comprising a CPU 502, memory 506, and storage device 510. CPU comprises cores 512A and 512B, I/O controller 514, and CPU memory controller 516. CPU 502, memory 506, storage device 510, cores 512A and 512B, I/O controller 514, and CPU memory controller 516 may respectively have any suitable characteristics of CPU 402, memory 406, storage device 410, cores 412A and 412B, I/O controller 414, and CPU memory controller 416 described above. In various embodiments, blockchain management system 104 may comprise a single computing system or any number of computing systems coupled together to collectively perform the functions described herein.

As depicted, blockchain management system 104 may maintain a copy of blockchain 200 within storage device 510 and/or other suitable memory (e.g., memory 506). Blockchain management system 104 may also store blockchain management logic 520 comprising instructions to allow a blockchain management system to extract relevant information from blockchain 200, execute a smart contract of blockchain 200, determine whether a proposed transaction is to be committed to the blockchain 200, construct new blocks for blockchain 200, add the new blocks to blockchain 200, and communicate with other blockchain management systems 104 and one or more security modules 102. In various embodiments, blockchain management logic 520 may comprise software executable by one or more cores 512. In some embodiments, blockchain management logic 520 may comprise hardware (e.g., circuitry) of blockchain management system 104 (e.g., distinct from the storage device 510) and/or software (some or all of which may be stored in storage device 510 or memory 506).

One important role of the blockchain management system 104 is to come to a consensus with other blockchain management systems 104 as to whether a transaction is to be committed to the blockchain 200. In various embodiments, the blockchain management systems may execute any suitable consensus method for such determinations. In various embodiments, the consensus method has relatively good average time to consensus and transaction finality properties. Average time to consensus will determine the minimum time it takes to commit a state reservation record into the blockchain 200. For blockchains such as Bitcoin, the consensus time is about 10 minutes per block, which may result in an unacceptable latency in some applications. In one embodiment, the blockchain may be based on Hyperledger Sawtooth and may use a POET consensus algorithm, resulting in a consensus time as low as milliseconds.

Transaction finality may involve a risk analysis. Blockchains such as Bitcoin where finality is probabilistic may require that a record is part of a chain with N commits beyond the block containing the reservation before considering the block to be final. N is 6 for approximately 1/1,000 chance of double-use of a counter, 13 for 1/1,000,000, and 162 for the chance to be so small that the private key is more likely to be guessed by the attacker. Hyperledger Sawtooth with POET has similar properties to Bitcoin, but the shorter consensus time leads to much faster time to confidence that a counter will not be used twice. In one embodiment, a Hyperledger Sawtooth with a Practical Byzantine Fault Tolerant (PBFT) consensus algorithm may be used for the blockchain 200, which would all but eliminate the possibility of a double use of a state value in a permissioned blockchain deployment.

In some embodiments, creation of a block may include finding a solution associated with the block (e.g., solving for a nonce value) during a mining process. Once a solution is found by a particular blockchain management system 104, the solution is broadcast to the other blockchain management systems 104, verified by these recipients, and the block is added to the blockchain 200. The requesting security module 102 may then be explicitly notified by the blockchain management system 104, or the security module 102 may monitor the blockchain (or an entity may monitor the blockchain on the module's behalf) and determine that the requested state has been committed and is allocated to the module. When two security modules 102 request the same state, the blockchain management systems 104 perform a consensus algorithm and the block containing the requested state that first passes the consensus algorithm may be committed, while the other request will be rejected (and may prompt the rejected security module 102 to submit an additional request for a different state).

Figure 6:
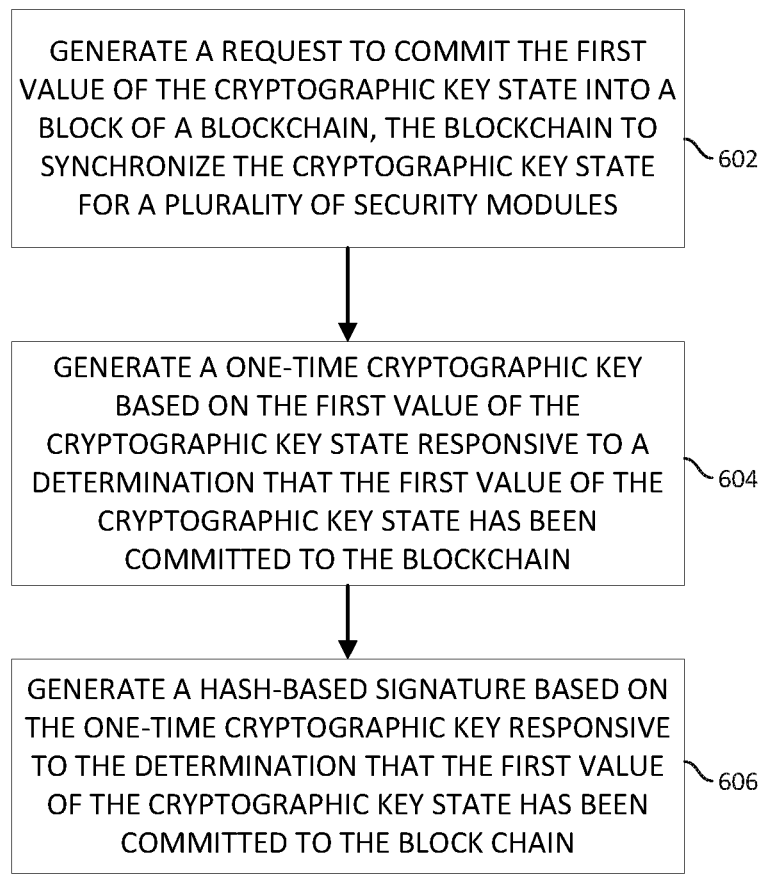
FIG. 6 illustrates a flow for synchronizing a cryptographic key state through a blockchain in accordance with certain embodiments.

FIG. 6 illustrates a flow for synchronizing a cryptographic key state through a blockchain in accordance with certain embodiments. Any suitable logic of the disclosure may perform these functions, such as security module 102.

At 602, a request to commit the first value of the cryptographic key state into a block of a blockchain is generated, the blockchain to synchronize the cryptographic key state for a plurality of security modules. At 604, a one-time cryptographic key based on the first value of the cryptographic key state is generated responsive to a determination that the first value of the cryptographic key state has been committed to the blockchain. At 606, a hash-based signature is generated based on the one-time cryptographic key responsive to the determination that the first value of the cryptographic key state has been committed to the blockchain.

Some of the operations illustrated in FIG. 6 may be repeated, combined, modified or deleted where appropriate, and additional steps may also be added to the flow in various embodiments. Additionally, steps may be performed in any suitable order without departing from the scope of particular embodiments.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

In various embodiments, a medium storing a representation of the design may be provided to a manufacturing system (e.g., a semiconductor manufacturing system capable of manufacturing an integrated circuit and/or related components). The design representation may instruct the system to manufacture a device capable of performing any combination of the functions described above. For example, the design representation may instruct the system regarding which components to manufacture, how the components should be coupled together, where the components should be placed on the device, and/or regarding other suitable specifications regarding the device to be manufactured.

A module as used herein refers to circuitry and any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Logic may be used to implement any of the flows described or functionality of the various components such as security module 102, blockchain management system 104, computing system 106, subcomponents of any of these, or other entity or component described herein. "Logic" may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a storage device containing instructions, combinations of logic devices (e.g., as would be found on a printed circuit board), or other suitable hardware and/or software. Logic may include one or more gates or other circuit components. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in storage devices.

Use of the phrase 'to' or 'configured to,' in one embodiment, refers to arranging, putting together, manufacturing, offering to sell, importing, and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash storage devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

In at least one embodiment, an apparatus comprises a memory to store a first value of a cryptographic key state; and a processor to generate a request to commit the first value of the cryptographic key state into a block of a blockchain, the blockchain to synchronize the cryptographic key state for a plurality of security modules; and generate a one-time cryptographic key based on the first value of the cryptographic key state responsive to a determination that the first value of the cryptographic key state has been committed to the blockchain.

In an embodiment, the processor is further to generate a hash-based signature based on the one-time cryptographic key responsive to the determination that the first value of the cryptographic key state has been committed to the block chain. In an embodiment, the first value of the cryptographic key state represents a particular leaf node of an eXtended Merkle Signature Scheme (XMSS) tree. In an embodiment, a first block of the blockchain comprises a smart contract specifying an initial value of the cryptographic key state and a maximum value of the cryptographic key state. In an embodiment, a second block of the blockchain comprises a record indicating the first value of the cryptographic key state, wherein the second block further comprises a cryptographic hash of the first block. In an embodiment, a first block of the blockchain comprises a list of identifiers of the plurality of security modules that are allowed to request values of the cryptographic key state to be committed to the blockchain. In an embodiment, the request further comprises a range of values of the cryptographic key state and the processor is to generate, for each value of the range of values of the cryptographic key state, a one-time cryptographic key based on the respective value after determining that the range of values of the cryptographic key state have been committed to the blockchain. In an embodiment, the range of values of the cryptographic key state represents an XMSS tree of a Multi Tree XMSS ($XMSS^{MT}$). In an embodiment, the request further comprises information identifying data to be signed using the one-time cryptographic key, and wherein the information identifying the data to be signed is committed to the blockchain. In an embodiment, the processor is to generate the request comprising the first value of the cryptographic key state responsive to a determination that a request comprising a second value of the cryptographic key state was not committed to the blockchain. In an embodiment, the processor is further to generate a signing key, distribute the signing key to the plurality of security modules, and generate the one-time cryptographic key further based on the signing key. In an embodiment, the apparatus further comprises one or more of a battery communicatively coupled to the processor, a display communicatively coupled to the processor, or a network interface communicatively coupled to the processor.

In at least one embodiment, a system comprises a memory to store a blockchain comprising a smart contract; and a processor to receive a request to commit a first value of a cryptographic key state into a block of the blockchain, the blockchain to synchronize the state for a plurality of security modules; determine whether the request complies with the smart contract of the blockchain; and responsive to a determination that the request complies with the smart contract of the blockchain, commit the first value of the cryptographic key state into a block of the blockchain.

In an embodiment, the smart contract specifies an identifier of a signing key used by a plurality of security modules to generate one-time cryptographic keys based on values of the cryptographic key state. In an embodiment, the smart contract specifies an initial value of the cryptographic key state and a maximum value of the cryptographic key state. In an embodiment, the request further comprises a request to commit a plurality of values of the cryptographic key state into the block of the blockchain.

In at least one embodiment, at least one machine readable storage medium having instructions stored thereon may be provided, the instructions when executed by a machine to cause the machine to generate a request to commit a first value of a cryptographic key state into a block of a blockchain, the blockchain to synchronize the cryptographic key state for a plurality of security modules; and generate a one-time cryptographic key based on the first value of the cryptographic key state responsive to a determination that the first value of the cryptographic key state has been committed to the blockchain.

In an embodiment, the instructions when executed to cause the machine to generate a hash-based signature based on the one-time cryptographic key responsive to the determination that the first value of the cryptographic key state has been committed to the block chain. In an embodiment, a first block of the blockchain comprises a smart contract specifying an initial value of the cryptographic key state and a maximum value of the cryptographic key state. In an embodiment, a second block of the blockchain comprises a record indicating the first value of the cryptographic key state, wherein the second block further comprises a cryptographic hash of the first block.

In some embodiments, methods may be provided to perform any of the functions of the apparatuses described above. In various embodiments, computer readable media may comprise instructions to perform any of the functions of the apparatuses described above.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
a memory to store a first value of a cryptographic key state; and
a processor to:
generate a request to commit the first value of the cryptographic key state into a block of a blockchain, the blockchain to synchronize the cryptographic key state for a plurality of security modules; and
generate a one-time cryptographic key based on the first value of the cryptographic key state responsive to a determination that the first value of the cryptographic key state has been committed to the blockchain.

2. The apparatus of claim 1, wherein the processor is further to generate a hash-based signature based on the one-time cryptographic key responsive to the determination that the first value of the cryptographic key state has been committed to the block chain.

3. The apparatus of claim 1, wherein the first value of the cryptographic key state represents a particular leaf node of an eXtended Merkle Signature Scheme (XMSS) tree.

4. The apparatus of claim 1, wherein a first block of the blockchain comprises a smart contract specifying an initial value of the cryptographic key state and a maximum value of the cryptographic key state.

5. The apparatus of claim 4, wherein a second block of the blockchain comprises a record indicating the first value of the cryptographic key state, wherein the second block further comprises a cryptographic hash of the first block.

6. The apparatus of claim 1, wherein a first block of the blockchain comprises a list of identifiers of the plurality of security modules that are allowed to request values of the cryptographic key state to be committed to the blockchain.

7. The apparatus of claim 1, wherein the request further comprises a range of values of the cryptographic key state and the processor is to generate, for each value of the range of values of the cryptographic key state, a one-time cryptographic key based on the respective value after determining that the range of values of the cryptographic key state have been committed to the blockchain.

8. The apparatus of claim 7, wherein the range of values of the cryptographic key state represents an XMSS tree of a Multi Tree XMSS ($XMSS^{MT}$).

9. The apparatus of claim 1, wherein the request further comprises information identifying data to be signed using the one-time cryptographic key, and wherein the information identifying the data to be signed is committed to the blockchain.

10. The apparatus of claim 1, wherein the processor is to generate the request comprising the first value of the cryptographic key state responsive to a determination that a request comprising a second value of the cryptographic key state was not committed to the blockchain.

11. The apparatus of claim 1, wherein the processor is further to generate a signing key, distribute the signing key to the plurality of security modules, and generate the one-time cryptographic key further based on the signing key.

12. The apparatus of claim 1, further comprising one or more of a battery communicatively coupled to the processor, a display communicatively coupled to the processor, or a network interface communicatively coupled to the processor.

13. A system comprising:
a memory to store a blockchain comprising a smart contract; and
a processor to:
receive a request to commit a first value of a cryptographic key state into a block of the blockchain, the blockchain to synchronize the cryptographic key state for a plurality of security modules, wherein the cryptographic key state comprises state information of a secret signing key shared by the plurality of security modules;
determine whether the request complies with the smart contract of the blockchain; and
responsive to a determination that the request complies with the smart contract of the blockchain, commit the first value of the cryptographic key state into a block of the blockchain.

14. The system of claim 13, wherein the smart contract specifies an identifier of a signing key used by a plurality of security modules to generate one-time cryptographic keys based on values of the cryptographic key state.

15. The system of claim 13, wherein the smart contract specifies an initial value of the cryptographic key state and a maximum value of the cryptographic key state.

16. The system of claim 13, wherein the request further comprises a request to commit a plurality of values of the cryptographic key state into the block of the blockchain.

17. At least one non-transitory machine readable storage medium having instructions stored thereon, the instructions when executed by a machine to cause the machine to:
generate a request to commit a first value of a cryptographic key state into a block of a blockchain, the blockchain to synchronize the cryptographic key state for a plurality of security modules; and
generate a one-time cryptographic key based on the first value of the cryptographic key state responsive to a determination that the first value of the cryptographic key state has been committed to the blockchain.

18. The at least one medium of claim 17, the instructions when executed to cause the machine to generate a hash-based signature based on the one-time cryptographic key responsive to the determination that the first value of the cryptographic key state has been committed to the block chain.

19. The at least one medium of claim 17, wherein a first block of the blockchain comprises a smart contract specifying an initial value of the cryptographic key state and a maximum value of the cryptographic key state.

20. The at least one medium of claim 19, wherein a second block of the blockchain comprises a record indicating the first value of the cryptographic key state, wherein the second block further comprises a cryptographic hash of the first block.

* * * * *